(12) United States Patent
Sodagar

(10) Patent No.: US 11,490,169 B2
(45) Date of Patent: Nov. 1, 2022

(54) EVENTS IN TIMED METADATA TRACKS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/916,617

(22) Filed: Jun. 30, 2020

(65) Prior Publication Data

US 2021/0006871 A1 Jan. 7, 2021

Related U.S. Application Data

(60) Provisional application No. 62/869,861, filed on Jul. 2, 2019.

(51) Int. Cl.
*G06F 15/16* (2006.01)
*H04N 21/84* (2011.01)
*H04N 21/845* (2011.01)
*H04L 65/65* (2022.01)

(52) U.S. Cl.
CPC .............. *H04N 21/84* (2013.01); *H04L 65/65* (2022.05); *H04N 21/8456* (2013.01)

(58) Field of Classification Search
CPC ... H04N 21/84; H04N 21/8456; H04L 65/608
USPC ......................................................... 709/219
See application file for complete search history.

(56) References Cited

U.S. PATENT DOCUMENTS

| 2016/0182593 | A1* | 6/2016 | Denoual .......... H04N 21/23439 |
| | | | 709/219 |
| 2017/0104803 | A1* | 4/2017 | Giladi ..................... H04L 65/60 |
| 2018/0139490 | A1* | 5/2018 | Yamagishi ......... H04N 21/8456 |
| 2018/0159909 | A1* | 6/2018 | Huang .................... H04L 65/60 |
| 2018/0205473 | A1* | 7/2018 | Kitahara ................ G08B 25/08 |
| 2019/0149857 | A1* | 5/2019 | Lo .................... H04N 21/43074 |
| | | | 709/219 |
| 2020/0228851 | A1* | 7/2020 | Santos ............... H04N 21/6125 |
| 2020/0275148 | A1* | 8/2020 | Stockhammer .. H04N 21/26241 |
| 2020/0296434 | A1* | 9/2020 | Kwak .................. H04N 21/438 |

OTHER PUBLICATIONS

International Standard, "Information technology—Dynamic adaptive streaming over HTTP (DASH)—Part 1: Media presentation description and segment formats", ISO-IEC 23009-1, Draft Third Edition, Sep. 25, 2018 (222 pages).

* cited by examiner

*Primary Examiner* — Alan S Chou
(74) *Attorney, Agent, or Firm* — ArentFox Schiff LLP

(57) ABSTRACT

An information processing apparatus is provided. The information processing apparatus includes processing circuitry configured to receive a manifest file for a content stream. The processing circuitry is configured to notify an application, based on the received manifest file, of one or more event schemes in a timed metadata track of the content stream. The processing circuitry is configured to receive, from the application, a subscription request to an event scheme of the one or more event schemes. Further, the processing circuitry is configured to dispatch to the application, based on the received subscription request, event messages associated with the event scheme in the timed metadata track.

16 Claims, 10 Drawing Sheets

| Element or Attribute Name | Use | Description |
|---|---|---|
| EmbeddedEventStream | | specifies embedded event Stream in metadata track |
| @xlink:href | O | specifies a reference to an external EmbeddedEventStream element |
| @xlink:actuate | OD<br><br>default:<br>onRequest | specifies the processing instructions, which can be either "onLoad" or "onRequest".<br><br>This attribute shall not be present if the @xlink:href attribute is not present. |
| @schemeIdUri | M | identifies the message scheme. The string may use URN or URL syntax. When a URL is used, it is recommended to also contain a month-date in the form mmyyyy; the assignment of the URL must have been authorized by the owner of the domain name in that URL on or very close to that date. A URL may resolve to an Internet location, and a location that does resolve may store a specification of the message scheme. |
| @value | O | specifies the value for the event stream element. The value space and semantics must be defined by the owners of the scheme identified in the @schemeIdUri attribute. |
| @timescale | O | specifies the timescale in units per seconds to be used for the derivation of different real-time duration values in the Event elements.<br><br>If not present on any level, it shall be set to 1. |
| @presentationTimeOffset | OD<br><br>Default: 0 | specifies the presentation time offset of this Embedded Event that aligns with the start of the Period. Any Event contained in this Stream is mapped to the Period timeline by using the Event presentation time corrected by the value of the presentation time offset.<br><br>The value of the presentation time offset in seconds is the division of the value of this attribute and the value of the @timescale attribute. |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 5

| Element or Attribute Name | Use | Description |
|---|---|---|
| *Common attributes and elements* | | |
| @profiles | O | specifies the profiles which the associated Representation(s) conform to of the list of Media Presentation profiles. The value shall be a subset of the respective value in any higher level of the document hierarchy (Representation, Adaptation Set, MPD).<br><br>If not present, the value is inferred to be the same as in the next higher level of the document hierarchy. For example, if the value is not present for a Representation, then @profiles at the Adaptation Set level is valid for the Representation. |
| @width | O | specifies the horizontal visual presentation size of the video media type on a grid determined by the @sar attribute.<br><br>In the absence of @sar width and height are specified as if the value of @sar were "1:1"<br><br>NOTE The visual presentation size of the video is equal to the number of horizontal and vertical samples used for presentation after encoded samples are cropped in response to encoded cropping parameters, "overscan" signaling, or "pan/scan" display parameters, e.g. SEI messages.<br><br>If not present on any level, the value is unknown. |
| ... | | |
| SupplementalProperty | 0 ... N | specifies supplemental information about the containing element that may be used by the DASH client optimizing the processing. |

*FIG. 6A*

| Element or Attribute Name (continued) | Use | Description |
|---|---|---|
| InbandEventStream | 0 ... N | specifies the presence of an inband event stream in the associated Representations. |
| EmbeddedEventStream | 0 ... N | specifies the presence of an embedded inband event stream in a timed metadata track for the associated Representations. |
| Switching | 0 ... N | specifies switch-to times and types for the associated Representations.<br><br>These elements shall only be present if the @timescale value is the same for all Representations in one Adaptation Set and if the Segment Timeline is used for segment duration signaling. |
| RandomAccess | 0 ... N | specifies a random access times and types for the associated Representations.<br><br>These elements shall only be present if the @timescale value is the same for all Representations in one Adaptation Set and if the Segment Timeline is used for segment duration signaling. |
| GroupLabel | 0 ... N | specifies a summary label for a group of Labels. |
| Label | 0 ... N | specifies a textual description of the element that may be used for annotation and selection purposes. |
| Legend:<br>For attributes: M=Mandatory, O=Optional, OD=Optional with Default Value, CM=Conditionally Mandatory.<br>For elements: <minOccurs>..<maxOccurs> (N=unbounded)<br>Elements are bold; attributes are non-bold and preceded with an @. | | |

FIG. 6B

EVENTS IN TIMED METADATA TRACKS

CROSS-REFERENCE TO RELATED PATENT APPLICATION

This application claims the benefit of priority to U.S. Provisional Application No. 62/869,861, "SIGNALING AND PROCESSING OF EMBEDDED EVENTS IN SPARSE TIMED METADATA TRACKS" filed on Jul. 2, 2019, which is incorporated by reference herein in its entirety.

TECHNICAL FIELD

The present disclosure describes embodiments related to timed metadata tracks.

BACKGROUND

The background description provided herein is for the purpose of generally presenting the context of the disclosure. Work of the presently named inventor, to the extend the work is described in this background section, as well as aspects of the description that may not otherwise qualify as prior art at the time of filing, are neither expressly or impliedly admitted as prior art against the present disclosure.

Moving Picture Experts Group Dynamic Adaptive Streaming over HTTP (MPEG-DASH or DASH) provides a standard for streaming multimedia content over Internet Protocol (IP) networks. The streaming multimedia content can include a content stream of live or on-demand (pre-recorded) content.

In MPEG-DASH, a manifest called a Media Presentation Description (MPD) describes media data segments and provides information necessary for a DASH client to reproduce the multimedia content. The MPD can indicate different representations (e.g., quality levels) of media that are available, such as different video resolutions and bit rates of the same media segments. Further, while the MPD can signal the existence of some types of events, MPEG-DASH does not provide a solution for providing signaling for timed metadata tracks.

SUMMARY

Aspects of the disclosure provide methods, apparatuses, and non-transitory computer-readable storage mediums for processing or providing a timed metadata track.

Aspects of the present disclosure include an information processing apparatus. The information processing apparatus includes processing circuitry configured to receive a manifest file for a content stream. The processing circuitry is configured to notify an application, based on the received manifest file, of one or more event schemes in a timed metadata track of the content stream. The processing circuitry is configured to receive, from the application, a subscription request to an event scheme of the one or more event schemes. Further, the processing circuitry is configured to dispatch to the application, based on the received subscription request, event messages associated with the event scheme in the timed metadata track.

In an embodiment, the manifest file is a media presentation description (MPD).

In an embodiment, the MPD includes one or more elements that identify the one or more event schemes in the timed metadata track.

In an embodiment, the processing circuitry is configured to dispatch the event messages associated with the event scheme to the application based on a dispatch mode indicated by the subscription request.

In an embodiment, an element of the one or more elements of the MPD that identifies the event scheme includes a Uniform Resource Identifier (URI) of the event scheme.

In an embodiment, the element of the MPD indicates a value for the element. Further, the URI and the value identify the event scheme.

In an embodiment, the one or more event schemes include a plurality of event schemes. Further, only a subset of the plurality of event schemes is identified by the one or more elements of the MPD.

In an embodiment, the one or more elements of the MPD are included in common attributes and elements of the MPD.

Aspects of the present disclosure include a method for processing a timed metadata track of a content stream. A manifest file for the content stream is received. An application is notified, based on the received manifest file, of one or more event schemes in the timed metadata track of the content stream. A subscription request to an event scheme of the one or more event schemes is received from the application. Further, event messages associated with the event scheme in the timed metadata track are dispatched to the application based on the received subscription request.

In an embodiment, the manifest file is a media presentation description (MPD).

In an embodiment, the MPD includes one or more elements that identify the one or more event schemes in the timed metadata track.

In an embodiment, the event messages associated with the event scheme are dispatched to the application based on a dispatch mode indicated by the subscription request.

In an embodiment, an element of the one or more elements of the MPD that identifies the event scheme includes a Uniform Resource Identifier (URI) of the event scheme.

In an embodiment, the element of the MPD indicates a value for the element. Further, the URI and the value identify the event scheme.

In an embodiment, the one or more event schemes include a plurality of event schemes. Further, only a subset of the plurality of event schemes is identified by the one or more elements of the MPD.

In an embodiment, the one or more elements of the MPD are included in common attributes and elements of the MPD.

Aspects of the present disclosure include an information providing apparatus. The information providing apparatus includes processing circuitry configured to generate a timed metadata track for the content stream. The timed metadata track includes event messages associated with one or more event schemes. The processing circuitry is configured to generate a manifest file that identifies at least one of the one or more event schemes in the timed metadata track. Further, the processing circuitry is configured to provide the manifest file to an information processing apparatus.

In an embodiment, the processing circuitry is configured to generate a plurality of manifest files. Each of the manifest files identifies different event schemes in the timed metadata track.

In an embodiment, the manifest file is a media presentation description (MPD).

In an embodiment, the MPD includes one or more elements that identify the one or more event schemes in the timed metadata track.

Aspects of the present disclosure include a method for providing a timed metadata track of a content stream. The timed metadata track for the content stream is generated. The timed metadata track includes event messages associated with one or more event schemes. A manifest file that identifies at least one of the one or more event schemes in the timed metadata track is generated. Further, the manifest file is provided to an information processing apparatus.

In an embodiment, a plurality of manifest files is generated. Each of the manifest files identifies different event schemes in the timed metadata track.

In an embodiment, the manifest file is a media presentation description (MPD).

In an embodiment, the MPD includes one or more elements that identify the one or more event schemes in the timed metadata track.

Aspects of the disclosure also provide non-transitory computer-readable storage mediums storing instructions which when executed by a computer cause the computer to perform any one or a combination of the methods for processing and/or providing timed metadata tracks.

BRIEF DESCRIPTION OF THE DRAWINGS

Further features, the nature, and various advantages of the disclosed subject matter will be more apparent from the following detailed description and the accompanying drawings in which:

FIG. 5 illustrates exemplary semantics for an embedded event stream according to an embodiment of the present disclosure;

FIGS. 6A and 6B illustrate exemplary common attributes and elements according to an embodiment of the present disclosure;

DETAILED DESCRIPTION OF EMBODIMENTS

Figure 1:
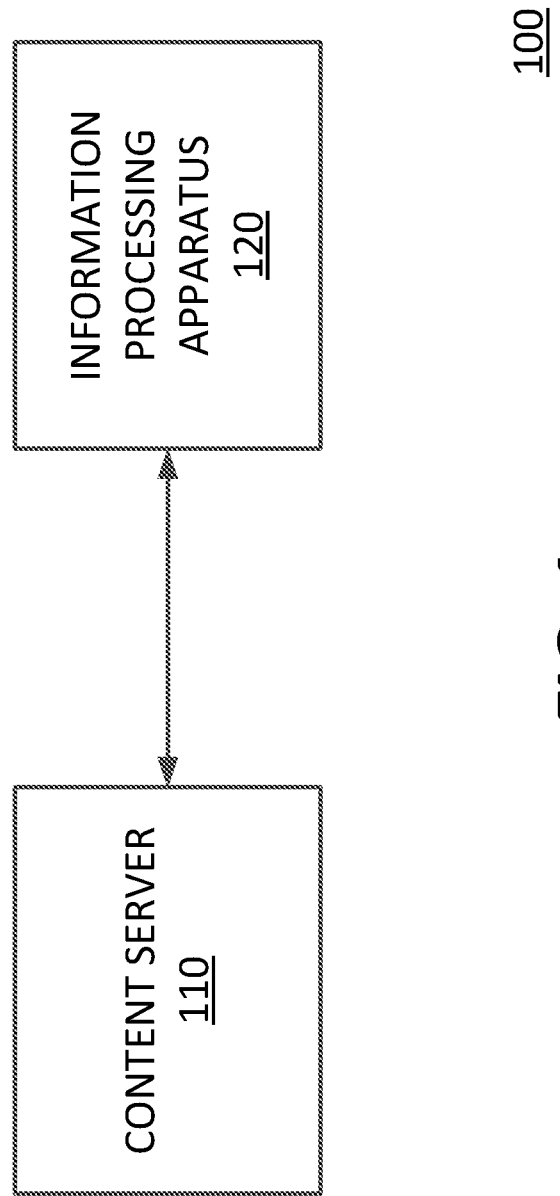
FIG. 1 illustrates a system according to an embodiment of the present disclosure.

For a more complete understanding of this disclosure, reference is now made to the following brief description, taken in connection with the accompanying drawings and detailed description, wherein like reference numerals represent like parts.

The present disclosure includes embodiments directed to signaling and processing of event information, such as event information included in timed metadata tracks. The event information can correspond to media timed events associated with points in time or periods of time in a media presentation (e.g., a continuous audio and/or video presentation). For example, the event information can be used for dynamic content replacement, ad insertion, presentation of supplemental content alongside audio and/or video, making changes to a web page, and executing application code triggered at specific points on a media timeline of the media presentation (e.g., an audio and/or video media stream).

The media timed events can be used to carry information intended to be synchronized with a media stream. For example, the event information can include metadata (or timed metadata) that describes content of the media presentation, such as program or chapter titles, or geolocation information. Further, the event information can include control messages for a media player that are associated with specific times during playback of the media presentation, such as advertisement insertion cues.

Media presentation description (MPD) events are events that can be signaled in the MPD. A sequence of events assigned to a media presentation time can be provided in the MPD on a period level. Events of the same type can be specified by an event stream element (e.g., EventStream) in a period element. Events terminate at the end of a period even if the start time is after the period boundary or duration of the event extends beyond the period boundary. The event stream element includes message scheme identification information (e.g., @schemeIdUri) and an optional value for the event stream element (e.g., @value). Further, as the event stream contains timed events, a time scale attribute (e.g., @timescale) can be provided to assign events to a specific media presentation time within the period. The timed events themselves can be described by an event element included in the event stream element.

Inband event streams can be multiplexed with representations by adding event messages as part of media segments. The event streams may be present in selected representations, in one or several selected adaptation sets only, or in all representations. For example, one possible configuration is one where only the audio adaptation sets contain inband events. An inband event stream that is present in a representation can be indicated by an inband event stream element (e.g., InbandEventStream) on an adaptation set or representation level. Further, one representation can contain multiple inband event streams, which are each indicated by a separate inband event stream elements.

Embodiments of the present disclosure can be implemented in MPEG-DASH. The timed metadata tracks can include embedded event message boxes (emsg) carrying event information. The timed metadata tracks can be used to carry similar information as the MPD events and inband events described above. The event information can include metadata that is time-synchronized with information provided in other tracks. Due to such synchronization, the metadata in the timed metadata tracks may be provided irregularly or non-continuously, and such time metadata tracks can be referred to as sparse timed metadata tracks.

A DASH client typically ignores event message boxes with scheme identifiers that are not defined in a manifest (e.g., an MPD). If a timed metadata track carries event message boxes as part of the track, the event scheme information for the event message boxes needs to be included in the MPD. The present disclosure includes embodiments that provide signaling for timed metadata tracks. The DASH client can discover the event message boxes and provide, for example, the event scheme information to an application based on the signaling for the timed metadata tracks. The application can then subscribe to event schemes of interest based on the event scheme information. The DASH client can parse the timed metadata track and dispatch event information based on the subscribed to event schemes.

FIG. 1 illustrates a system (100) according to an embodiment of the present disclosure. The system (100) includes a content server (110) and an information processing apparatus (120). The content server (110) can provide a content stream, including primary content (e.g., a main program) and one or more timed metadata tracks.

The information processing apparatus (120) can interface with the content server (110). For example, the information processing apparatus (120) can play back content received from the content server (110). The playback of the content can be performed based on a manifest file (e.g., an MPD) received by the information processing apparatus (120) (e.g., from the content server (110)). The manifest file can further include signaling for the one or more timed metadata tracks.

Figure 2:
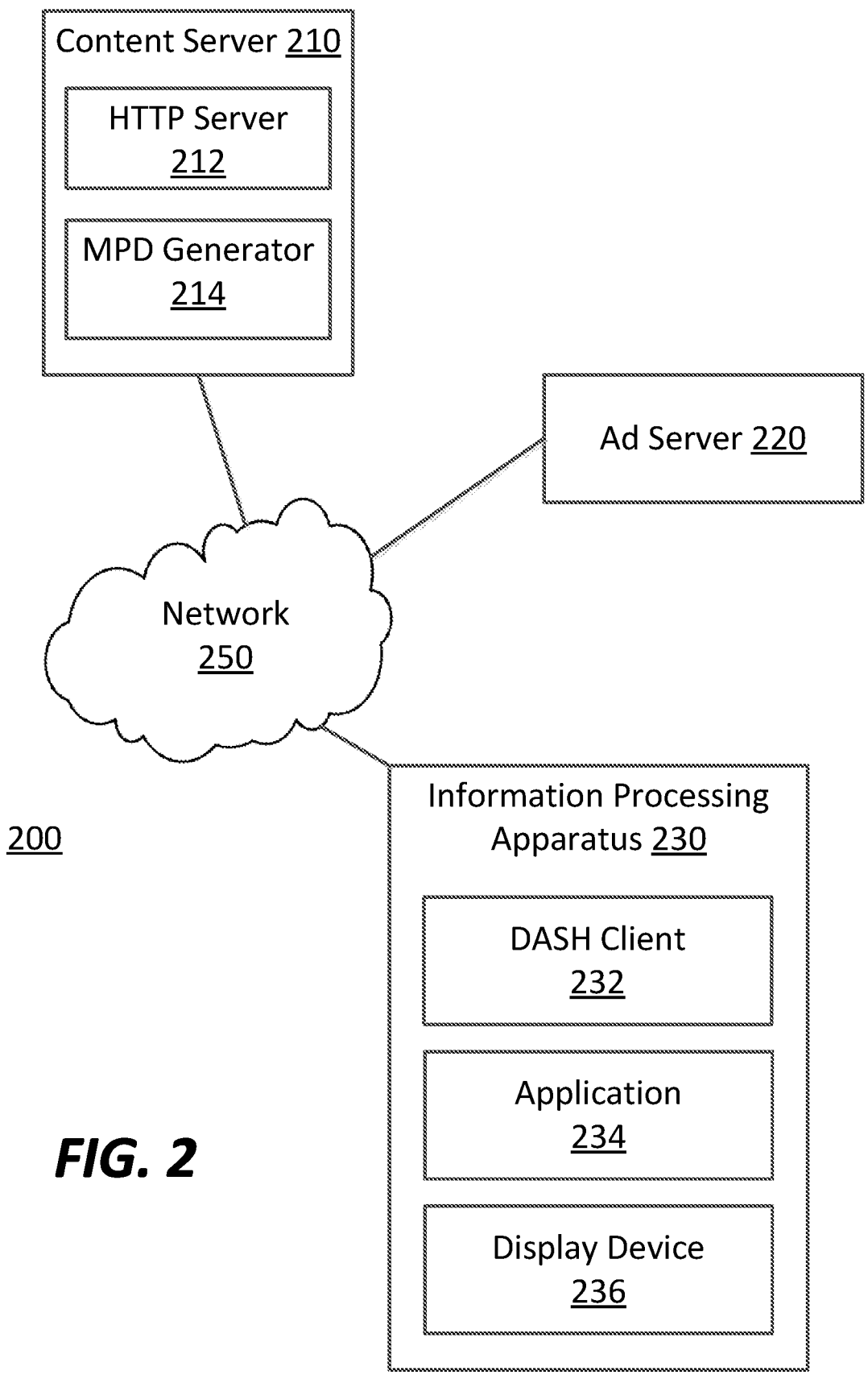
FIG. 2 illustrates a Dynamic Adaptive Streaming over HTTP (DASH) system according to an embodiment of the present disclosure.

An exemplary DASH system is illustrated in FIG. 2. The DASH system (200) can include a content server (210), an advertisement server (220), and an information processing apparatus (230) which are connected to a network (250). The DASH system (200) can also include one or more supplemental content servers.

The content server (210) can provide primary content (e.g., a main program) and a manifest file (e.g., an MPD), to the information processing apparatus (230). The manifest file can be generated by the MPD generator (214) for example. The primary content and the manifest file can be provided by different servers in other embodiments.

The information processing apparatus (230) receives the MPD and can acquire primary content from an HTTP server (212) of the content server (210) based on the MPD. The MPD can be processed by a DASH client (232) executed on the information processing apparatus (230). Further, the DASH client (232) can acquire advertisement content from the advertisement server (220), or other content (e.g., interactive content) from one or more supplemental content servers. The main content and the advertisement content can be processed by the DASH client (232) and output for display on a display device (236). The display device (236) can be integrated in, or external to, the information processing apparatus (230). Further, the DASH client (232) can extract event information from one or more timed metadata tracks and send the extracted event information to an application (234) for further processing. The application (234) can be configured, for example, to display supplemental content based on the event information.

The advertisement server (220) can store advertisement content in advertisement storage, such as a memory. The information processing apparatus (230) can request the stored advertisement content based on the event information, for example.

Figure 3:
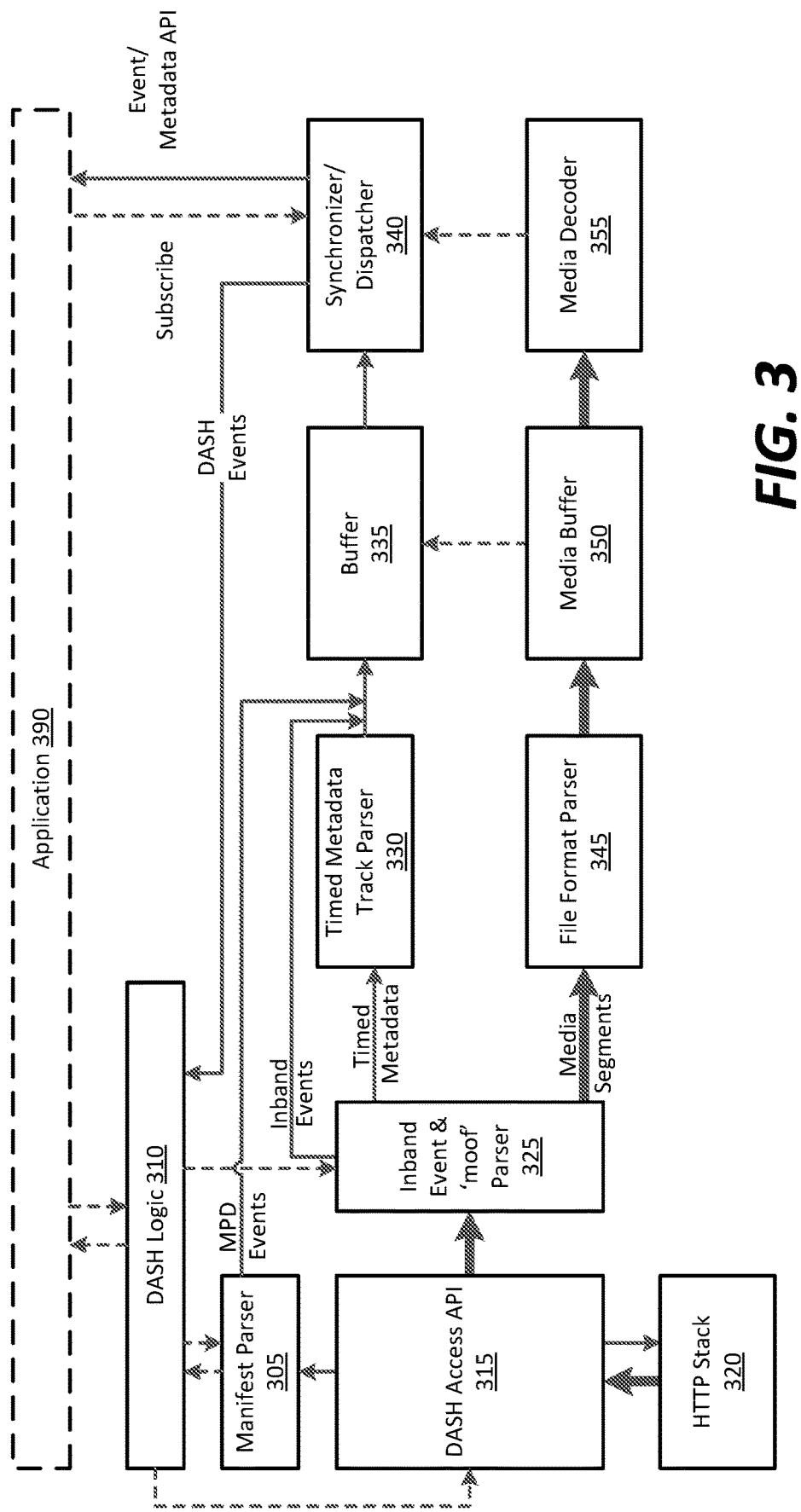
FIG. 3 illustrates a DASH client architecture according to an embodiment of the present disclosure.

FIG. 3 illustrates DASH client architecture according to an embodiment of the present disclosure. The DASH client (or DASH player) can be configured to communicate with an application (390) and process various types of events, including (i) MPD events, (ii) inband events, and (iii) timed metadata events.

A manifest parser (305) parses a manifest (e.g., an MPD). The manifest is provided by the content server (110, 210), for example. The manifest parser (305) extracts event information about MPD events, inband events, and timed metadata events embedded in timed metadata tracks. The extracted event information can be provided to DASH logic (310) (e.g., DASH player control, selection, and heuristic logic). The DASH logic (310) can notify an application (390) of event schemes signaled in the manifest based on the event information.

The event information can include event scheme information for distinguishing between different event streams. The application (390) can use the event scheme information to subscribe to event schemes of interest. The application (390) can further indicate a desired dispatch mode for each of the subscribed schemes through one or more subscription APIs. For example, the application (390) can send a subscription request to the DASH client that identifies one or more event schemes of interest and any desired corresponding dispatch modes.

If the application (390) subscribes to one or more event schemes that are delivered as part of one or more timed metadata tracks, an inband event and 'moof' parser (325) can stream the one or more timed metadata tracks to a timed metadata track parser (330). For example, the inband event and 'moof' parser (325) parses a movie fragment box ("moof") and subsequently parses the timed metadata track based on control information from the DASH logic (310).

The timed metadata track parser (330) can extract event messages embedded in the timed metadata track. The extracted event messages can be stored in an event buffer (335) (e.g., an event buffer). A synchronizer/dispatcher module (340) (e.g., event and timed metadata synchronizer and dispatcher) can dispatch (or send) the subscribed events to the application (390).

MPD events described in the MPD can be parsed by the manifest parser (305) and stored in the buffer (335). For example, the manifest parser (305) parses each event stream element of the MPD, and parses each event described in each event stream element. For each event signaled in the MPD, event information such as presentation time and event duration can be stored in the buffer (335) in association with the event.

The inband event and 'moof' parser (325) can parse media segments to extract inband event messages. Any such identified inband events and associated presentation times and durations can be stored in the buffer (335).

Accordingly, the buffer (335) can store therein MPD events, inband events, and/or timed metadata events. The buffer (335) can be a First-In-First-Out (FIFO) buffer, for example. The buffer (335) can be managed in correspondence with a media buffer (350). For example, as long as a media segment exists in the media buffer (350), any events or timed metadata corresponding to that media segment can be stored in the buffer (335).

A DASH Access Application Programming Interface (API) (315) can manage the fetching and reception of a content stream (or dataflow) including media content and various metadata through an HTTP protocol stack (320). The DASH Access API (315) can separate the received content stream into different dataflows. The dataflow provided to the inband event and moof parser can include media segments, one or more timed metadata tracks, and inband event signaling included in the media segments. In an embodiment, the dataflow provided to the manifest parser 305 can include an MPD.

The DASH Access API (315) can forward the manifest to the manifest parser (305). Beyond describing events, the manifest can also provide information on media segments to the DASH logic (310), which can communicate with the application (390) and the inband event and moof parser (325). The application (390) can be associated with the media content processed by the DASH client. Control/synchronization signals exchanged among the application (390), the DASH logic (310), the manifest parser (305), and the DASH Access API (315) can control the fetching of media segments from the HTTP Stack (320) based on information regarding media segments provided in the manifest.

The inband event and moof parser (325) can parse a media dataflow into media segments including media content, timed metadata in a timed metadata track, and any signaled inband events in the media segments. The media segments including media content can be parsed by a file format parser (345) and stored in the media buffer (350).

The events stored in the buffer (335) can allow the synchronizer/dispatcher (340) to communicate to the application the available events (or events of interest) related to the application through an event/metadata API. The application can be configured to process the available events (e.g., MPD events, inband events, or timed metadata events) and subscribe to particular events or timed metadata by notifying the synchronizer/dispatcher (340). Any events stored in the buffer (335) that are not related to the application, but are instead related to the DASH client itself can be forwarded by the synchronizer/dispatcher (340) to the DASH logic (310) for further processing.

In response to the application (390) subscribing to particular events, the synchronizer/dispatcher (340) can communicate to the application event instances (or timed metadata samples) corresponding to event schemes to which the application has subscribed. The event instances can be communicated in accordance with a dispatch mode indicated by the subscription request (e.g., for a specific event scheme) or a default dispatch mode. For example, in an on-receive dispatch mode, event instances may be sent to the application (390) upon receipt in the buffer (335). On the other hand, in an on-start dispatch mode, event instances may be sent to the application (390) at their associated presentation time, for example in synchronization with timing signals from the media decoder (355).

An MPD describes a DASH media presentation and can be in the form of an Extensible Markup Language (XML) document. The MPD can include a sequence of one or more periods. Each period can include one or more adaptation sets. Each adaptation set can include one or more representations. Further, each representation can include one or more segments. The MPD can define formats to announce HTTP uniform resource locators (URLs), or network addresses, for downloading segments of data.

A media presentation includes one or more periods. A period can be defined by a period element in an MPD element. In certain circumstances, the MPD is offered such that a next period is a continuation of content in a previous period, possibly the immediately following period or in a later period (e.g., after an advertisement period has been inserted).

An adaptation set can be described by an adaptation set element (e.g., AdaptationSet). Adaptation set elements can be contained in a period element. The adaptation set can include alternate representations (i.e., only one representation within an adaptation set is expected to be presented at a time). All representations contained in one adaptation set can represent the same media content components and therefore contain media streams that are considered to be perceptually equivalent. The adaptation set and the contained representations can contain sufficient information such that seamless switching across different representations in one adaptation set is enabled.

Representations can be described by a representation element. Representation elements are contained in an adaptation element, as noted above. The representation can be one of the alternative choices of the complete set or subset of media content components comprising the media content during a defined period. The representation can start at the start of the period (e.g., PeriodStart) and continue until the end of the period (i.e., the start of the next period or the end of the media presentation). Each representation can include one or more media streams, where each media stream is an encoded version of one media content component.

Each representation can include one or more segments. In an embodiment, the segment can be referenced by an HTTP-URL included in an MPD. The HTTP-URL can be defined as an <absolute-URI> according to IETF RFC 3986, for example, with a fixed scheme of "http" or "https", possibly restricted by a byte range if a range attribute is provided together with the URL. The byte range can be expressed as byte-range-spec as defined in IETF RFC 2616, for example. It can be restricted to a single expression identifying a contiguous range of bytes. In an embodiment, the segment can be included in the MPD with a data URL, for example as defined in IETF RFC 2397.

Each segment referenced through an HTTP-URL in the MPD can be associated with a segment availability interval (e.g., a time window in wall-clock time at which the segment can be accessed via the HTTP-URL). Representations can be assigned segment information through the presence of elements such as base URL, segment base, segment template, and/or segment list. The segment information can provide information on the location availability and properties of all segments contained in one representation.

Sub-representations can be embedded (or contained) in regular representations and described by a sub-representation element (e.g., SubRepresentation). The sub-representation element can describe properties of one or several media content components that are embedded in the representation. For example, the sub-representation element can describe properties of an embedded audio component (e.g., codec, sampling rate, etc.), an embedded sub-title (e.g., codec), or the sub-representation element can describe some embedded lower quality video layer (e.g., some lower frame rate, etc.). Sub-representation and representation elements can share some common attributes and elements.

Figure 4:
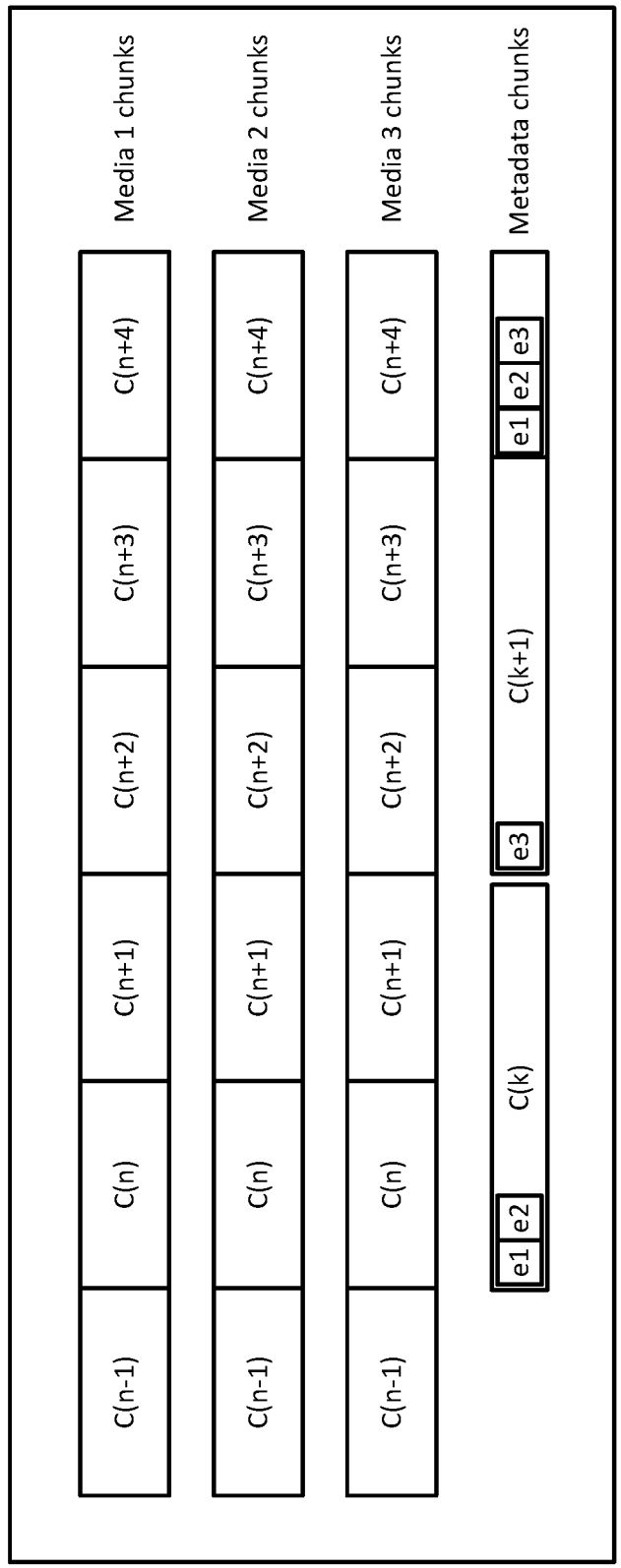
FIG. 4 illustrates embedded event message boxes in a timed metadata track according to an embodiment of the present disclosure.

FIG. 4 illustrates an example of media tracks and a timed metadata track that can be included in a content stream. The metadata track can include event message boxes (emsg). The event message boxes can be used to provide signaling for generic events related to media presentation time and signaling for events that are specific to DASH operations. In some embodiments, if a DASH client detects an event message box with a scheme that is not defined in an MPD, the DASH client ignores the event message box.

An event message box can include message scheme identification information (e.g., scheme_id_uri), an optional value for an event contained in the event message box, timing information, and event data. The timing information can indicate a timescale (e.g., in ticks per second) for other time information, such as a media presentation time delta of a media presentation time of the event from a reference presentation time (e.g., beginning of a segment or a metadata sample), a media presentation time of the event, and event duration (e.g., in media presentation time).

The metadata track can carry the event message boxes as part of metadata samples included in the metadata track. Further, a metadata sample can include one or more event message boxes. Each event message box can belong to an event scheme that is defined by a scheme URI id, and optionally a value, of the respective event message box. Since event instances from multiple schemes can be included in one or more metadata samples, the event schemes need to be identified in the DASH manifest in order for the schemes to be discovered by the DASH client.

DASH includes two elements that can be used to describe event schemes in an MPD. The two elements are an event stream element (e.g., EventStream) for MPD events and an inband event stream element (e.g., InbandEventStream) for inband events. Both event schemes can use the same construct.

Embodiments of the present disclosure include a new MPD element that can be used to describe timed metadata events provided in timed metadata tracks. The new MPD element can have the same, or a similar, construct as the inband event stream element. In one embodiment, the new MPD element is an embedded event stream element (or timed metadata event stream element) (e.g., EmbeddedEventStream). Exemplary semantics of the embedded event stream element are illustrated in FIG. 5.

As illustrated in FIG. 5, an embedded event stream element can be used to specify one or more timed metadata events (e.g., timed metadata instances/streams) in a timed metadata track. The embedded event stream element can include attributes such as reference information (e.g., @xlink:href), processing information (e.g., @xlink:actuate), message scheme identification information (e.g., @schemeIdUri), a value for the embedded event stream element (e.g., @value), time scale information (e.g., @timescale), and presentation time offset information (e.g., @presentationTimeOffset). The message scheme identification information, optionally paired with the value for the embedded event stream element, can be used to identify different event schemes within the timed metadata track. For example, the message scheme identification information in the embedded event stream element, optionally paired with the value for the embedded event stream element, can be matched to the message scheme identification information (e.g., scheme_id_uri) in the event message box, optionally paired with the value for an event.

The new MPD element (e.g., the embedded event stream element), used to describe timed metadata events provided in timed metadata tracks, can be included as part of the common elements and attributes in MPEG-DASH. The new MPD element can be included in a manner similar to the inband event stream. The elements adaptation set, representation, and sub-representation can have assigned common attributes and elements. The common attributes and elements (e.g., element CommonAttributesElements) can be present in all three elements. In some embodiments, the adaptation set element can contain default values for elements and attributes associated with the contained representations. Any of the common attributes may be present in only one of the adaptation set element and the representation element in some embodiments.

Exemplary semantics of the common attributes and elements are provided in the table illustrated in FIGS. 6A and 6B. In an embodiment, the 'Use' column in the common attributes and elements table can be interpreted such that an attribute marked with 'M' is available for a representation, for example it is either present in the representation element or in the corresponding adaptation set element. Further, in an embodiment, an attribute marked with 'O' may be absent in both.

FIGS. 6A and 6B illustrate an exemplary table of common adaptation set, representation, and sub-representation attributes and elements. Similar to the inband event stream element, the embedded event stream element can be included as part of the common attributes and elements (e.g., CommonAttributesElements) of an MPD. Accordingly, in an embodiment, any timed metadata track that carries embedded events has a corresponding adaptation set or representation element in the MPD. The MPD can include one embedded event stream element per event scheme for the embedded events. The DASH client can extract and process the embedded events in the timed metadata tracks for the events that have a corresponding embedded event stream element in the received MPD and ignores the others.

Figure 7:
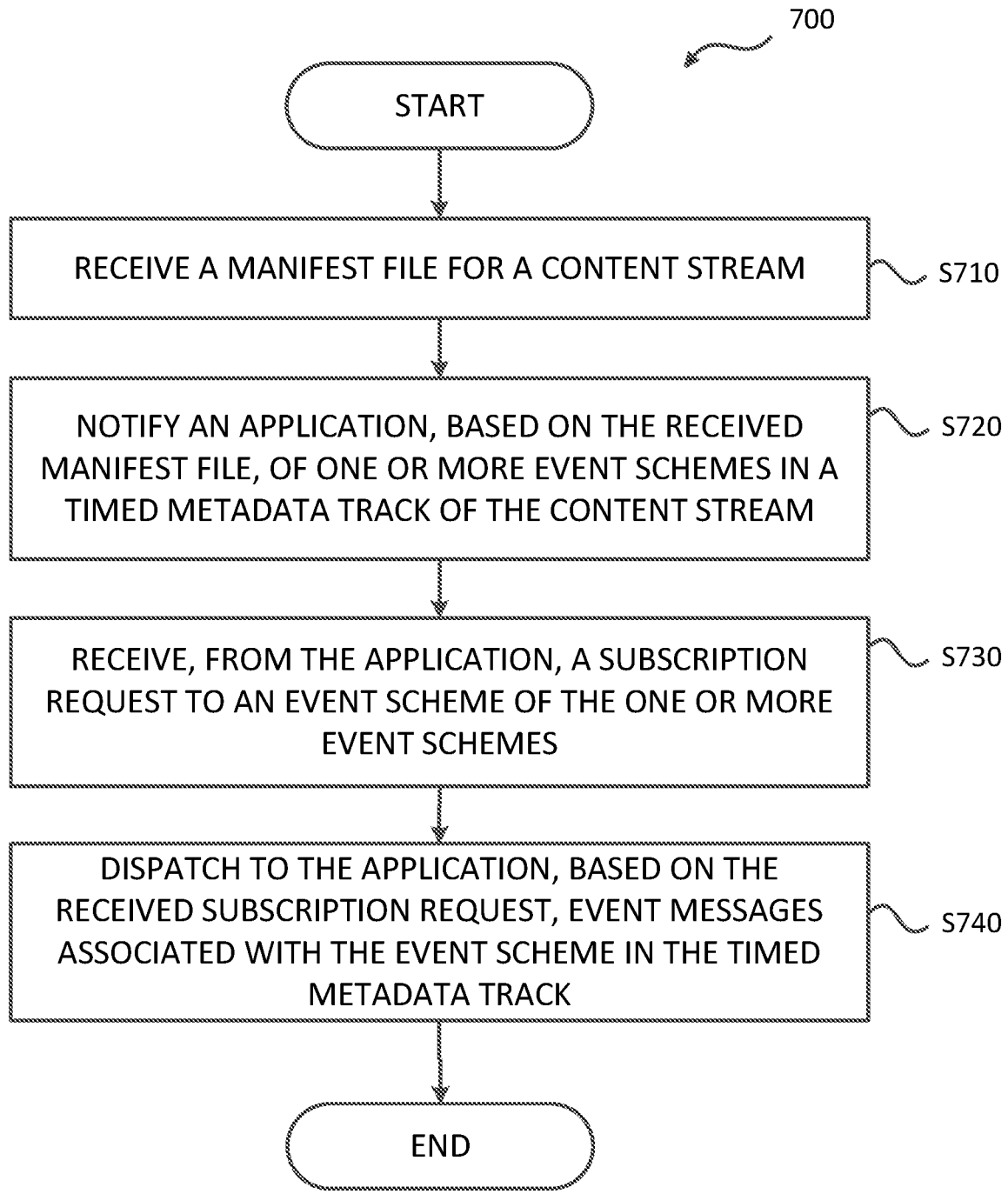
FIG. 7 illustrates an exemplary method of an information processing apparatus according to an embodiment of the present disclosure.

FIG. 7 illustrates an exemplary method (700) that can be performed by the information processing apparatus (120). The method (700) starts at step (S710) at which time a manifest file (e.g., a MPD) for a content stream is received (e.g., from the content server (110)) by the information processing apparatus (120). At step (S720), the information processing apparatus (120) notifies an application, based on the received manifest file, of one or more event schemes in a timed metadata track of the content stream. For example, the manifest file includes an embedded event stream element for each of the one or more event schemes. The information processing apparatus (120) identifies the one or more event schemes based on each embedded event stream element included in the manifest file.

At step (S730), the information processing apparatus (120) receives, from the application, a subscription request to an event scheme of the one or more event schemes. The subscription request can identify one or more event schemes of interest to the application. The subscription request can further identify a desired dispatch mode for a subset or each of the one or more schemes (e.g., through the subscription APIs).

At step (S740), the information processing apparatus (120) sends (or dispatches), to the application, event messages associated with the event scheme in the timed metadata track. For example, the DASH client retrieves event messages associated with the one or more subscribed to event schemes and sends the retrieved messages to the application. The event messages can be dispatched based on a dispatch mode indicated by the received subscription request and/or a default dispatch mode.

Figure 8:
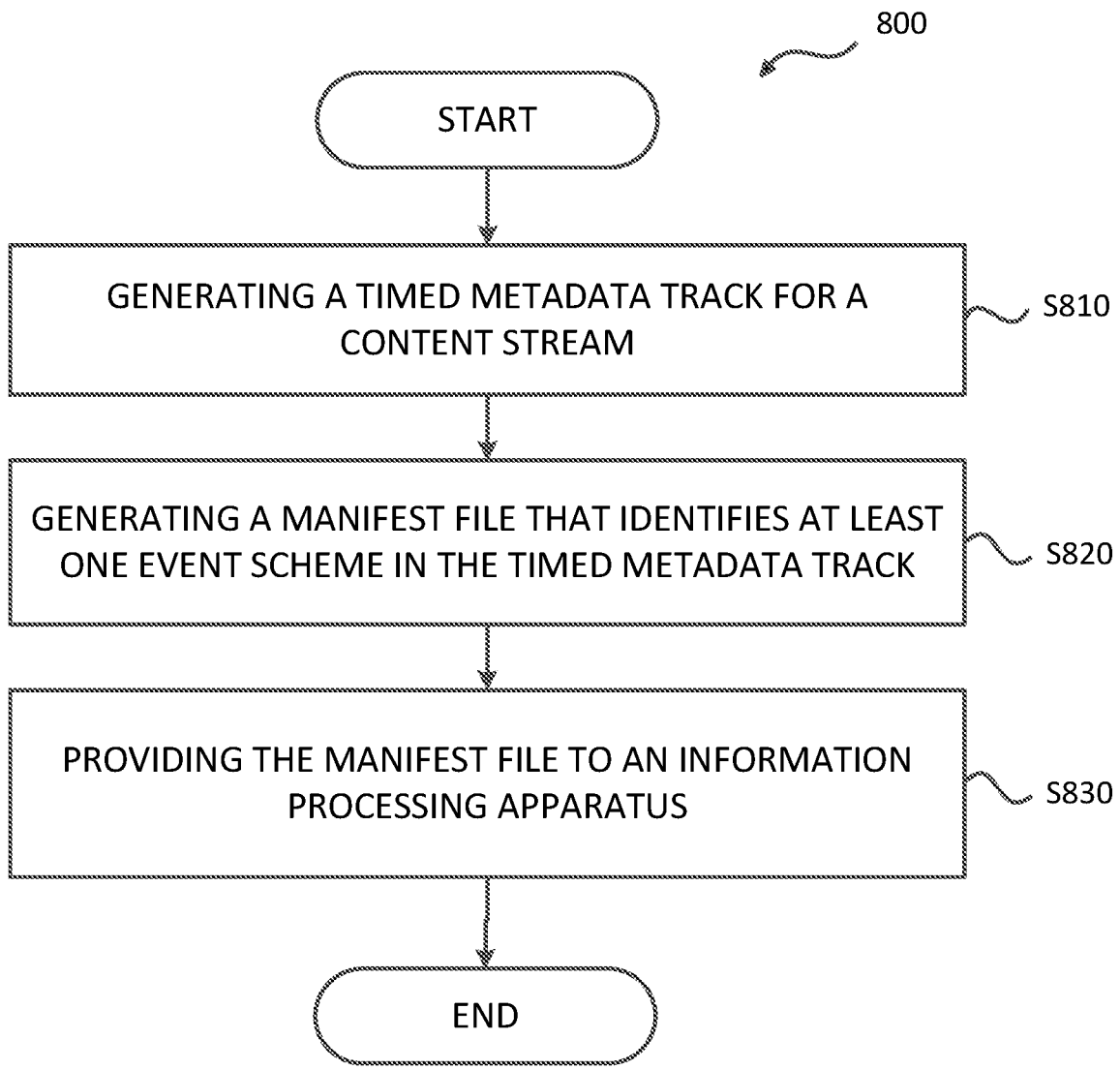
FIG. 8 illustrates an exemplary method of an information providing apparatus according to an embodiment of the present disclosure.

FIG. 8 illustrates an exemplary method (800) that can be performed by an information providing apparatus, such as the content server (110, 210). The method (800) starts at step (S810) at which time the information providing apparatus generates a timed metadata track for a content stream. A plurality of timed metadata tracks can be generated in other examples. The timed metadata track includes event messages associated with one or more event schemes. Each event scheme can be associated with a different scheme identification information (e.g., @schemeIdUri) or different scheme identification information (e.g., @schemeIdUri) and value (e.g., @value) pairing.

At step (S820), a manifest file (e.g., a MPD) can be generated for the content stream. The manifest file identifies at least one event scheme of the one or more event schemes in the timed metadata track. For example, the manifest file includes an embedded event stream element (e.g., EmbeddedEventStream) for each event scheme included in the timed metadata track. In some embodiments, the manifest file may not identify every event scheme included in the timed metadata track. For example, the manifest file may only include timed metadata event elements for certain event schemes. Further, in some embodiments, a plurality of different manifest files can be generated that identify different event schemes (e.g., different individual event schemes or combinations of event schemes). The different manifest files can be provided to different end users for customization or targeting purposes.

At step (S830), the manifest file can be provided to an information processing apparatus. In some embodiments, a plurality of different manifest files can be provided to different information processing apparatuses, or the same information processing apparatus (e.g., for user selection).

The proposed methods may be used separately or combined in any order. Further, each of the methods or embodiments, information processing apparatuses, information providing apparatus, and servers may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 9 shows a computer system (900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
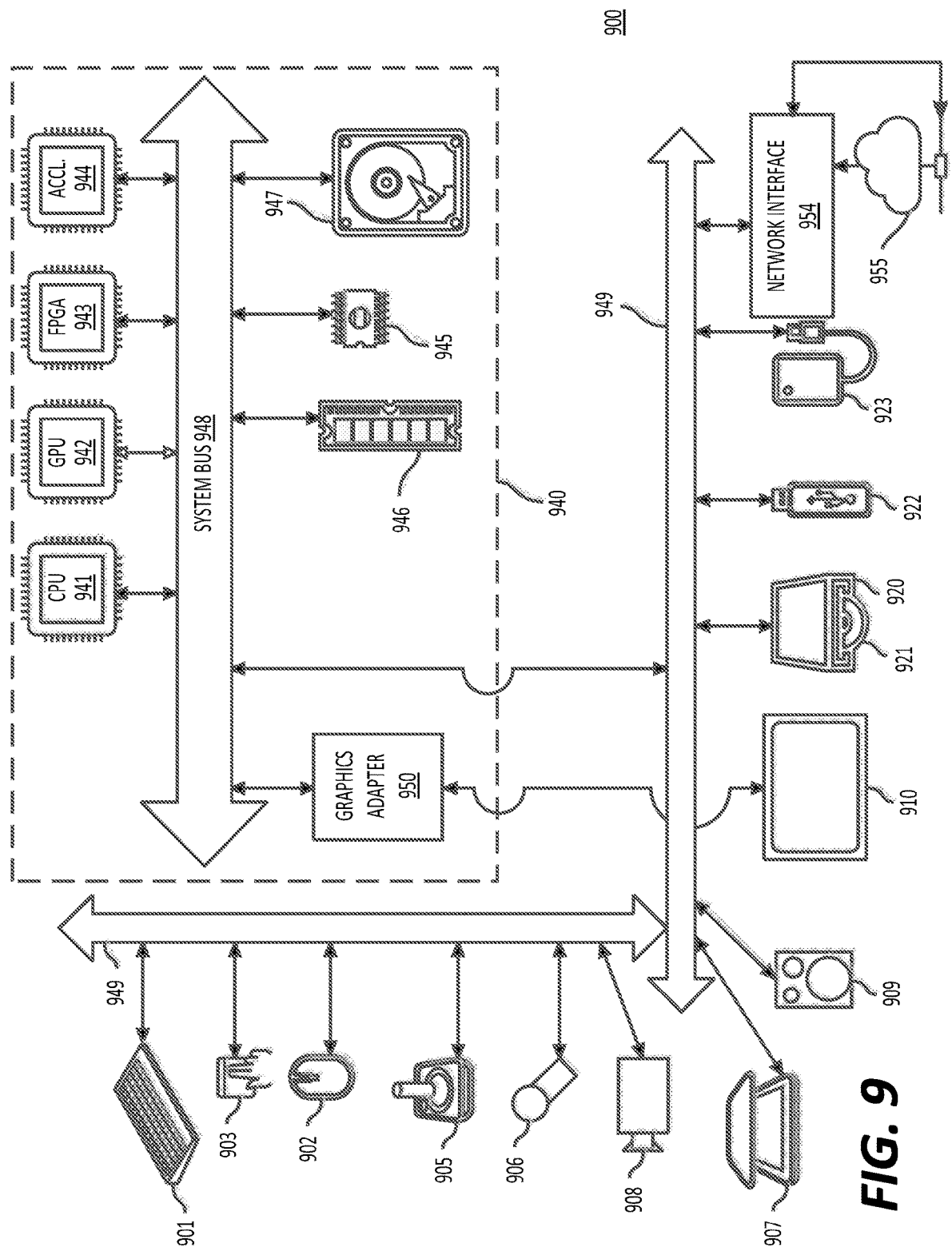
FIG. 9 illustrates a computer system according to some embodiments of the present disclosure.

The components shown in FIG. 9 for the computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of the computer system (900).

The computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (e.g., scanned images, photographic images obtain from a still image camera), video (e.g., two-dimensional video, three-dimensional video including stereoscopic video).

Input human interface devices may include one or more of (only one of each depicted): keyboard (901), mouse (902), trackpad (903), touch screen (910), data-glove (not shown), joystick (905), microphone (906), scanner (907), and camera (908).

Computer system (900) may also include certain human interface output devices. Such human interface output devices may be stimulating the senses of one or more human users through, for example, tactile output, sound, light, and smell/taste. Such human interface output devices may include tactile output devices (e.g., tactile feedback by the touch-screen (910), data-glove (not shown), or joystick (905), but there can also be tactile feedback devices that do not serve as input devices), audio output devices (e.g., speakers (909), headphones (not depicted)), visual output devices (e.g., screens (910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

The computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

The computer system (900) can also include an interface (954) to one or more communication networks (955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (e.g., USB ports of the computer system (900)); others are commonly integrated into the core of the computer system (900) by attachment to a system bus as described below (for example Ethernet interface into a PC computer system or cellular network interface into a smartphone computer system). Using any of these networks, the computer system (900) can communicate with other entities. Such communication can be uni-directional, receive only (e.g., broadcast TV), uni-directional send-only (e.g., CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators for certain tasks (944), graphics adapter (950), and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). In an example, a display (910) (e.g., display panel or projector) can be connected to the graphics adapter (950). Architectures for a peripheral bus include PCI, USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (e.g., accelerator (944)), which can operate in place of or together with software to execute particular processes or particular parts of particular processes described herein. Reference to software can encompass logic, and vice versa, where appropriate. Reference to a computer-readable media can encompass a circuit (e.g., an integrated circuit (IC)) storing software for execution, a circuit embodying logic for execution, or both, where appropriate. The present disclosure encompasses any suitable combination of hardware and software.

What is claimed is:

1. An information processing apparatus comprising:
   processing circuitry configured to
   prior to receiving a subscription request from an application to an event scheme,
   receive a media presentation description (MPD) for a content stream, the MPD including one or more embedded event stream elements embedded in a timed metadata track, each of the one or more embedded event stream elements identifying a respective event scheme, and
   notify the application, based on the one or more embedded event stream elements in the received MPD, of one or more respective event schemes identified by the one or more embedded event stream elements in the MPD,
   receive, from the application, the subscription request to the event scheme, the event scheme being one of the one or more respective event schemes identified by the one or more embedded event stream elements in the MPD, and
   dispatch to the application, based on the received subscription request, event messages associated with the event scheme in the timed metadata track.

2. The information processing apparatus according to claim 1, wherein the processing circuitry is configured to dispatch the event messages associated with the event scheme to the application based on a dispatch mode indicated by the subscription request.

3. The information processing apparatus according to claim 1, wherein an embedded event stream element of the one or more embedded event stream elements of the MPD that identifies the event scheme includes a Uniform Resource Identifier (URI) of the event scheme.

4. The information processing apparatus according to claim 3, wherein
   the embedded event stream element of the MPD indicates a value for the embedded event stream element, and
   the URI and the value identify the event scheme.

5. The information processing apparatus according to claim 1, wherein
   only a subset of a plurality of available event schemes is identified by the one or more embedded event stream elements of the MPD.

6. The information processing apparatus according to claim 1, wherein the one or more embedded event stream elements of the MPD are included in common attributes and elements of the MPD.

7. The information processing apparatus according to claim 1, wherein the one or more embedded event stream elements includes a plurality of embedded event stream elements, each of the embedded event stream elements identifying a different event scheme of a plurality of available event schemes.

8. The information processing apparatus according to claim 7, wherein the timed metadata track is different from an inband event stream that is specified by an inband event stream element.

9. A method for processing a timed metadata track of a content stream, the method comprising:
   prior to receiving a subscription request from an application to an event scheme,
   receiving, by interface circuitry, a media presentation description (MPD) for the content stream, the MPD including one or more embedded event stream elements embedded in a timed metadata track, each of the one or more embedded event stream elements identifying a respective event scheme,
   notifying the application, based on the one or more embedded event stream elements in the received MPD, of one or more respective event schemes identified by the one or more embedded event stream elements in the MPD,
   receiving, from the application, the subscription request to the event scheme, the event scheme being one of the one or more respective event schemes identified by the one or more embedded event stream elements in the MPD, and
   dispatching to the application, based on the received subscription request, event messages associated with the event scheme in the timed metadata track.

10. The method according to claim 9, wherein the dispatching comprises:

dispatching the event messages associated with the event scheme to the application based on a dispatch mode indicated by the subscription request.

11. The method according to claim 9, wherein an embedded event stream element of the one or more embedded event stream elements of the MPD that identifies the event scheme includes a Uniform Resource Identifier (URI) of the event scheme.

12. The method according to claim 11, wherein
the embedded event stream element of the MPD indicates a value for the embedded event stream element, and
the URI and the value identify the event scheme.

13. The method according to claim 9, wherein
only a subset of a plurality of available event schemes is identified by the one or more embedded event stream elements of the MPD.

14. The method according to claim 9, wherein the one or more embedded event stream elements of the MPD are included in common attributes and elements of the MPD.

15. A method for providing a timed metadata track of a content stream, the method comprising:
generating the timed metadata track for the content stream, the timed metadata track including embedded event messages, each of the embedded event messages associated with a corresponding event scheme of a plurality of event schemes;
generating a media presentation description (MPD) including one or more embedded event stream elements, each of the one or more embedded event stream elements identifying a respective event scheme of the plurality of event schemes; and
providing the MPD to an information processing apparatus such that, after the MPD is received in the information processing apparatus, an application executed in the information processing apparatus generates a subscription request to an event scheme, the subscribed event scheme being identified by one of the one or more embedded event stream elements of the provided MPD.

16. The method according to claim 15, wherein the generating the MPD comprises:
generating a plurality of MPDs, the MPDs identifying different event schemes of the plurality of event schemes.

* * * * *